United States Patent
Drzewiecki et al.

(10) Patent No.: US 6,862,341 B2
(45) Date of Patent: Mar. 1, 2005

(54) DEVICE AND METHOD OF INTERFACING VOICE DATA BETWEEN A SWITCH AND A COMPUTER SYSTEM

(75) Inventors: Robert B. Drzewiecki, East Amherst, NY (US); Eugene S. DeFabio, Buffalo, NY (US)

(73) Assignee: Intel Corporation, Santa Clara, CA (US)

( * ) Notice: Subject to any disclaimer, the term of this patent is extended or adjusted under 35 U.S.C. 154(b) by 581 days.

(21) Appl. No.: 09/834,713

(22) Filed: Apr. 13, 2001

(65) Prior Publication Data

US 2002/0150218 A1 Oct. 17, 2002

(51) Int. Cl.[7] .............................................. H04M 1/64
(52) U.S. Cl. ...................................... 379/67.1; 370/359
(58) Field of Search ............................. 379/67.1, 88.07; 370/352, 353, 354, 355, 356, 357, 358, 359, 360, 401

(56) References Cited

U.S. PATENT DOCUMENTS

| | | | | |
|---|---|---|---|---|
| 4,907,225 A | * | 3/1990 | Gulick et al. | 370/463 |
| 5,623,491 A | * | 4/1997 | Skoog | 370/397 |
| 5,978,672 A | * | 11/1999 | Hartmaier et al. | 455/413 |
| 6,125,277 A | * | 9/2000 | Tanaka | 455/436 |
| 6,144,724 A | * | 11/2000 | Stovall | 379/93.05 |
| 6,570,976 B2 | * | 5/2003 | Asada et al. | 379/221.01 |
| 6,639,983 B1 | * | 10/2003 | Kielty et al. | 379/399.01 |
| 6,643,709 B1 | * | 11/2003 | Kwon | 709/246 |
| 2002/0075879 A1 | * | 6/2002 | Ramey | 370/401 |
| 2003/0086556 A1 | * | 5/2003 | Welch et al. | 379/265.09 |
| 2003/0095539 A1 | * | 5/2003 | Feuer | 370/352 |

* cited by examiner

Primary Examiner—Scott L. Weaver
(74) Attorney, Agent, or Firm—Blakely, Sokoloff, Taylor & Zafman LLP

(57) ABSTRACT

An interface device and a method according to the invention interfaces between a user and a switch according to programming parameters.

59 Claims, 4 Drawing Sheets

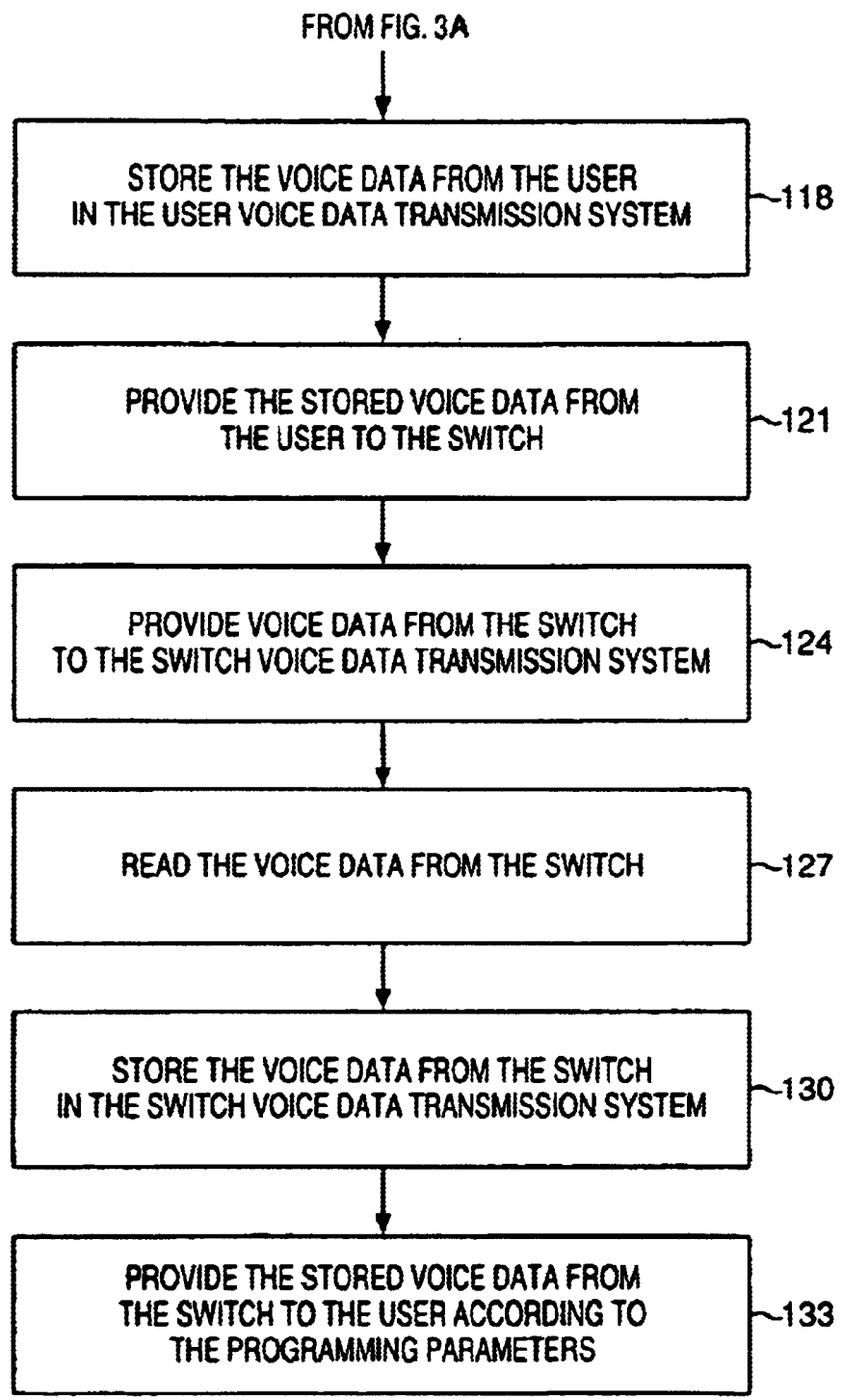

DEVICE AND METHOD OF INTERFACING VOICE DATA BETWEEN A SWITCH AND A COMPUTER SYSTEM

BACKGROUND INFORMATION

The invention relates generally to devices and methods of transmitting voice data between a switch and a computer system, such as those found in telephony systems. Existing means of transmitting voice data between a switch and a computer system require a communication device that is designed to facilitate communications with one type of switch operating on a switch protocol, and one type of computer system operating on a computer system protocol. If either the switch protocol or the computer system protocol, or both, are changed, the communication device must also be changed. It is costly to purchase and install a new communication device.

BRIEF DESCRIPTION OF THE DRAWINGS

For a fuller understanding of the nature and objects of the invention, reference should be made to the following detailed description taken in conjunction with the accompanying drawings, in which:

FIGS. 3A and 3B are a block flow diagram in accordance with one embodiment of the invention.

DETAILED DESCRIPTION

Briefly, an embodiment of the invention comprises an interface device which includes a user voice data transmission system adapted for connection to a user such as a computer system found in telephony systems, a switch voice data transmission system adapted for connection to a switch such as a private branch exchange ("PBX"), and a programmable controller in communication with the user voice data transmission system and the switch voice data transmission system. The controller is programmable according to programming parameters to enable receipt of voice data via the user voice data transmission system and to enable sending of voice data via the switch voice data transmission system. Thus, the interface device may be programmed to accommodate a user operating on one protocol, and if the user is replaced with another user operating on a different protocol, the interface device need not be replaced but simply reprogrammed.

Figure 1:
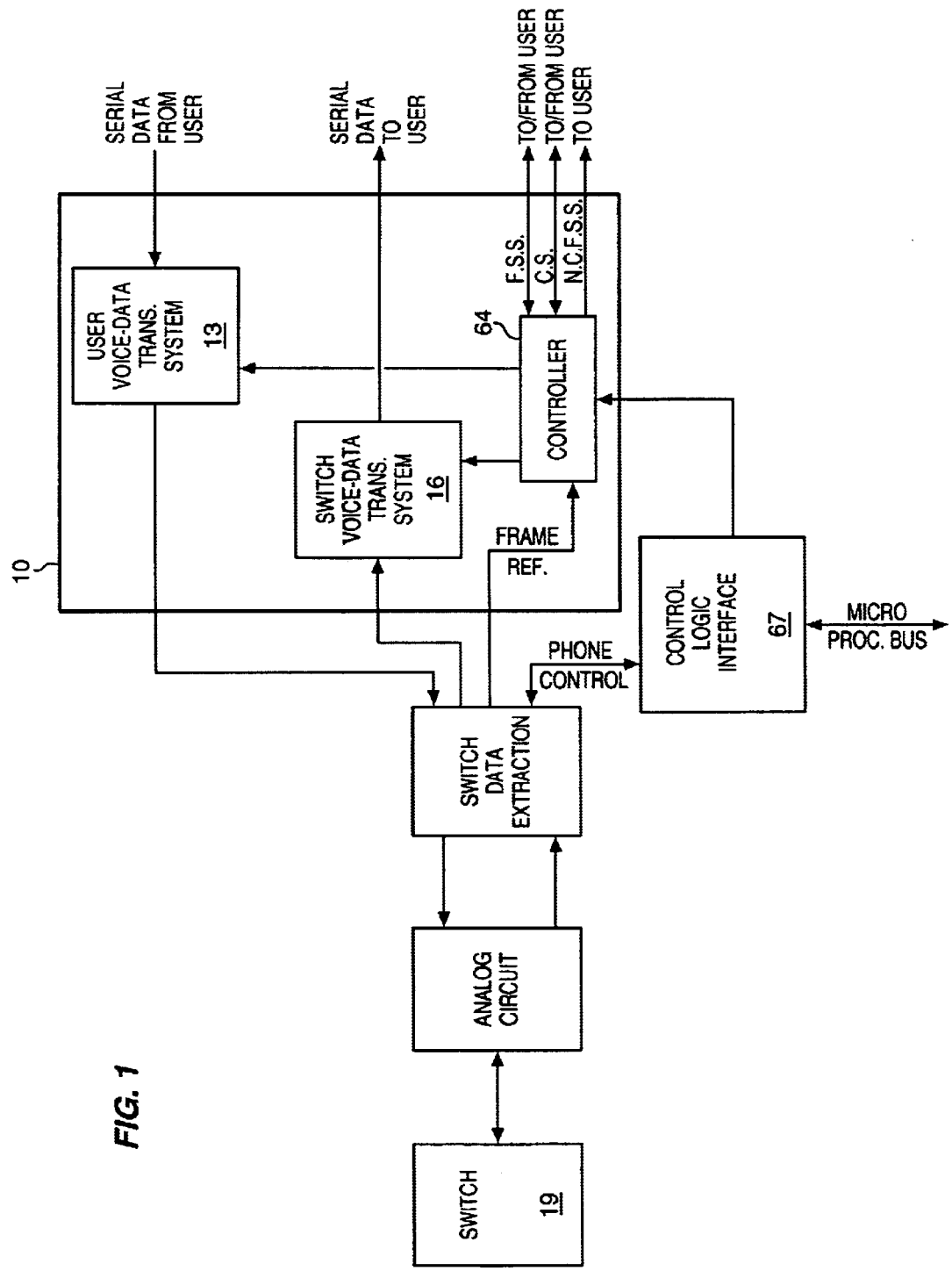
FIG. 1 is a block diagram of an interface device in accordance with one embodiment of the invention.
Figure 2:
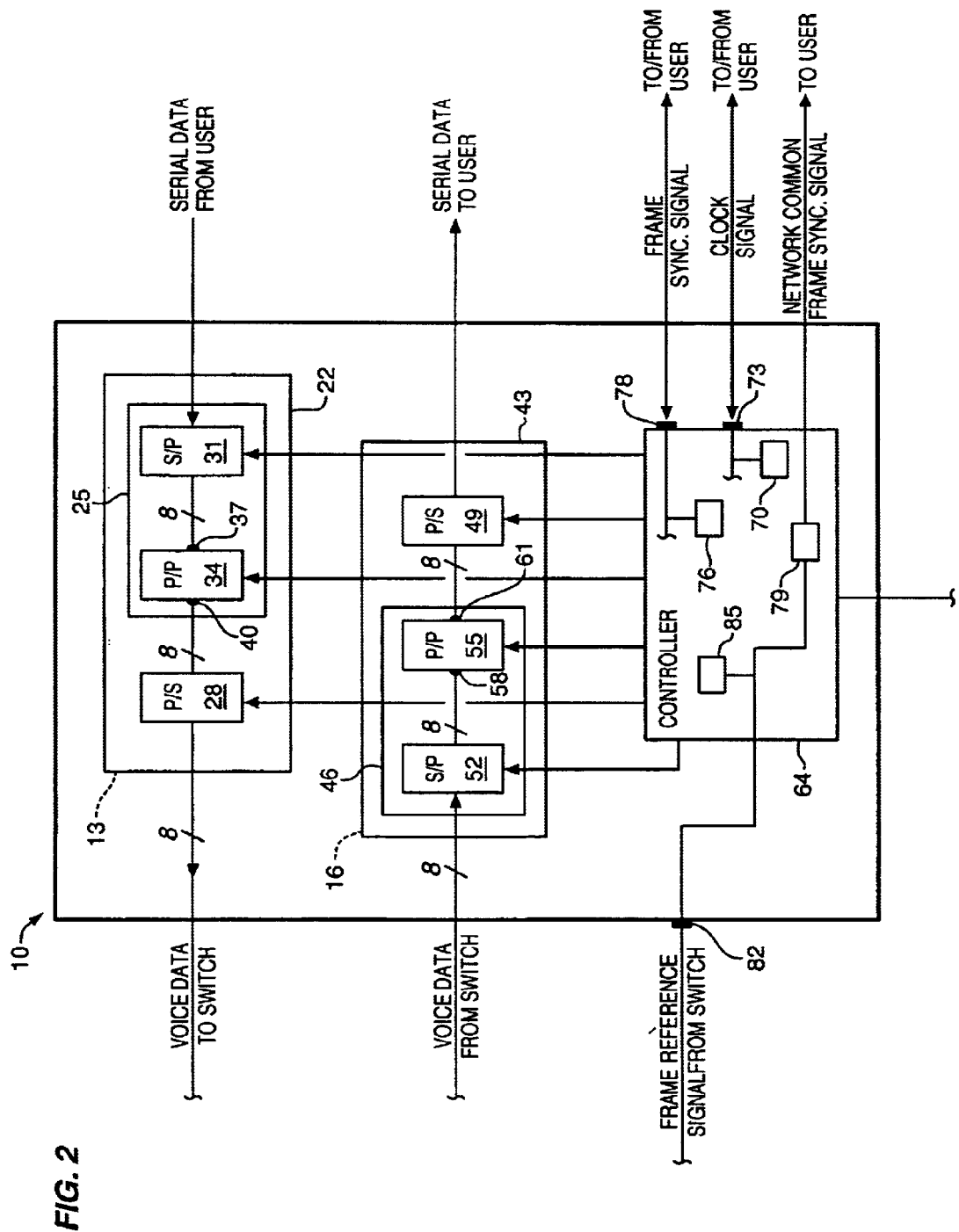
FIG. 2 is a block diagram of an interface device in accordance with one embodiment of the invention.

FIGS. 1 and 2 show an interface device 10 in accordance with one embodiment of the invention. The interface device 10 may have a user voice data transmission system 13 and a switch voice data transmission system 16. When in use, the user voice data transmission system 13 may be capable of reading and storing voice data provided by a user (herein referred to as "user voice data"), and may be capable of providing the user voice data to a switch 19, such as a private branch exchange ("PBX"). The switch voice data transmission system 16 may be capable of reading and storing voice data from the switch 19 (herein referred to as "switch voice data"), and providing the switch voice data to the user. The user may be a computer system, such as those found in telephony systems. For example, the user may be a voice processing device on a localized time division multiplexed ("TDM") interface, such as a voice bus resource card.

FIG. 2 shows the interface device 10 in more detail. The user voice data transmission system 13 may be in the form of a user data storage device 22 that may be capable of storing user voice data provided by the user, and that may be capable of providing that user voice data to the switch 19 at the proper time. The user data storage device 22 may include a receiving storage device 25 and a sending storage device 28. The receiving storage device 25 may be capable of storing the user voice data until the sending storage device 28 is ready to accept the user voice data stored in the receiving storage device 25. The sending storage device may be capable of storing the user voice data from the receiving storage device 25 until the switch 19 is ready to accept the user voice data stored in the sending storage device 28.

The receiving storage device 25 may include a serial-parallel register 31, an intermediate register 34 having a receiving port 37 in communication with the serial-parallel register 31, and a sending port 40 in communication with the sending storage device 28. The sending storage device 28 may include a parallel-serial register, and the intermediate register 34 may include a parallel-parallel register.

The switch voice data transmission system 16 may be in the form of a switch data storage device 43 that is capable of storing switch voice data provided by the switch 19 and providing that switch voice data to the user at the proper time. The switch data storage device 43 may include a receiving storage device 46 and a sending storage device 49. The receiving storage device 46 may be capable of storing the switch voice data until the sending storage device 49 is ready to accept switch voice data stored in the receiving storage device 46. The sending storage device 49 may be capable of storing the switch voice data from the receiving storage device 46 until the user is ready to accept the switch voice data stored in the sending storage device 49. The sending storage device 49 may include a parallel-serial register.

The receiving storage device 46 may include an intake register 52 and an intermediate register 55. The intermediate register 55 may have a receiving port 58 in communication with the intake register 52 and has a sending port 61 in communication with the sending storage device 49. The intermediate register 55 may include a parallel-parallel register, and the intake register 52 may include a serial-parallel register.

Referring to FIG. 1, the interface device 10 may also include a programmable controller 64 in communication with the user voice data transmission system 13, and in communication with the switch voice data transmission system 16. The controller 64 may be programmable according to programming parameters. The programming parameters may be provided by an application developer via a control logic interface 67 using, for example, a personal computer to view a display provided by the control logic interface 67. The programming parameters may include a clock polarity, a polarity of a frame synchronization signal, a clock signal rate, and a frame synchronization signal location. The programming parameters may also include a source of a clock signal and a source of a frame synchronization signal. By knowing information about the type of user to be connected to the interface device 10, the application developer can program the interface device 10 so that user voice data is properly read by the user voice data transmission system 13, and so that the switch voice data is properly provided to the user by the switch voice data transmission system 16.

For example, in known TDM systems the polarity of the frame synchronization signal may be inverted or non-inverted, and so the interface device 10 may be programmed to accommodate both types of systems. Other variations between known TDM systems, such as the clock signal rate, the clock polarity (the time, relative to a rising edge or a falling edge of the clock signal, when data is sampled) and the frame synchronization signal location (relative to the start of a frame) may be programmed into the interface device 10. For example, the interface device 10 may be programmed to accommodate a clock signal rate of 4.096 MHz, 2.048 MHz or 8.192 MHz. For any particular clock signal rate, existing TDM systems have a standard number of time slots and the location of the time slots containing voice data is also standard. Therefore, when the user is a TDM system, by programming the clock signal rate the controller is also programmed for the number of time slots per frame, and is also programmed for which time slots may contain voice data. To accommodate users that do not operate on the existing TDM system formats, the number of time slots per frame and the time slots within a frame that may contain voice data may be included among the programming parameters.

The interface device 10 may be programmed to accommodate a frame synchronization signal location that straddles a frame boundary, occurs during the last bit time of a previous frame, occurs during a first bit time of a frame, or envelopes a voice data slot. The source of the clock signal may be programmed to be the interface device 10 or the user. The source of the frame synchronization signal may also be programmed to be the interface device 10 or the user.

Once programmed with the programming parameters, the controller 64 may be capable of (a) instructing the user voice data transmission system 13 to read the user voice data according to the programming parameters, (b) instructing the user data storage device 22 to store the user voice data, and (c) instructing the user data storage device 22 to provide the stored user voice data to the switch 19. The programmed controller 64 may also be capable of (a) instructing the switch voice data transmission system 16 to read the switch voice data according to the programming parameters, (b) instructing the switch data storage device 43 to store the switch voice data, and (c) instructing the switch data storage device 43 to provide the stored switch voice data to the user in a format according to the programming parameters.

As shown in FIG. 2, the interface device 10 may further include a bit clock 70 that is capable of providing a clock signal to the user at the programmed clock signal rate. When the interface device 10 is provided with the bit clock 70, the programming parameters may include a clock signal source programming parameter to specify whether the clock signal is provided by the bit clock 70 of the interface device 10 or by the user. To accommodate users that provide the clock signal, the interface device may include a clock signal port 73 for receiving a clock signal from the user. The clock signal port 73 may also be used to provide the clock signal to the user.

The clock signal (regardless of its source) may be used by the controller 64 to control the user voice data transmission system 13 and the switch voice data transmission system 16. For example, the controller 64 may be capable of instructing the user voice data transmission system 13 to read and shift data into the user data storage device 22 on a rising edge or a falling edge of the clock signal. An additional programming parameter may be provided to allow an application developer to specify whether the controller 64 should instruct user voice data to be read and shifted into the user data storage device 22 on a rising edge or a falling edge of the clock signal. Furthermore, the controller 64 may be capable of being programmed to instruct the switch voice data transmission system 16 to shift data out of the switch data storage device 43 to the user on a falling edge or a rising edge of the clock signal. An additional programming parameter may be provided to allow the application developer to specify whether the controller 64 should instruct user voice data to be shifted out of the switch data storage device 43 on a falling edge or a rising edge of the clock signal.

In one embodiment of the invention, a programming parameter referred to herein as the "clock polarity" may be used to program the controller 64 to shift data into (from the user) and out of (to the user) the voice data transmission systems 13, 16. In this embodiment, when the controller 64 is programmed such that the clock polarity is programmed as a "non-inverted" state, user voice data is shifted into the user data storage device 22 on a rising edge of the clock signal, and switch voice data is shifted out of the switch data storage device 43 on a falling edge of the clock signal. However, when the controller 64 is programmed such that the clock polarity is programmed as an "inverted" state, user voice data is shifted into the user data storage device 22 on a falling edge of the clock signal, and switch voice data is shifted out of the switch data storage device 43 on a rising edge of the clock signal.

The interface device 10 may further include a frame synchronization signal generator 76 that may be capable of providing a frame synchronization signal to the user. When the interface device 10 is provided with the frame synchronization signal generator 76, the programming parameters may include the option to specify the source of the frame synchronization signal. For example, the frame synchronization signal source may be programmed to be the interface device 10 or the user. To accommodate users that provide the frame synchronization signal, the interface device 10 may include a frame synchronization signal port 78 for receiving the frame synchronization signal from the user. The frame synchronization signal port 78 may also be used to provide the frame synchronization signal to the user. The controller 64 may be capable of using the frame synchronization signal (regardless of the source of the signal) to control the user voice data transmission system 13 and the switch voice data transmission system 16 to indicate the location of the start of a frame, and thereby, the slot within the frame that corresponds to the voice data.

The interface device 10 may further include a network common frame synchronization signal generator 79 and a frame reference signal port 82. The network common frame synchronization signal generator 79 may be capable of providing to the user a network common frame synchronization signal that is oscillating at a rate substantially equal to an oscillation rate of a frame reference signal provided at the frame reference signal port 82. However, when no frame reference signal is provided at the frame reference signal port 82, an internal clock 85 of the interface device 10 may be used to provide the oscillation rate to the network common frame synchronization signal generator 79.

In an embodiment of the invention, the interface device may have a frame synchronization signal generator 76, a network common frame synchronization signal generator 79, a frame reference signal port 82 and an internal clock 85. The programming parameters may include a source of the frame synchronization signal. In this embodiment, when the source of the frame synchronization signal is programmed to be the interface device 10, then (a) if a frame reference signal is provided at the frame reference signal port 82, the interface device 10 may provide the network common frame synchronization signal to the user with an oscillation rate that is substantially equal to an oscillation rate of the frame reference signal, and (b) if no frame reference signal is provided at the frame reference signal port 82, the interface device 10 may provide the network common frame synchronization signal to the user with an oscillation rate that is substantially equal to an oscillation rate of the internal clock 85.

In an embodiment of the invention, when the source of the frame synchronization signal is programmed to be the user, synchronization of the frame synchronization signal to the network common frame synchronization signal may be the task of the user. However, when the source of the frame synchronization signal is programmed to be the interface device 10, the controller 64 may be responsible for synchronizing the frame synchronization signal to the network common frame synchronization signal. Therefore, the interface device 10 may be provided with circuitry capable of accomplishing this synchronization.

Figure 3A:
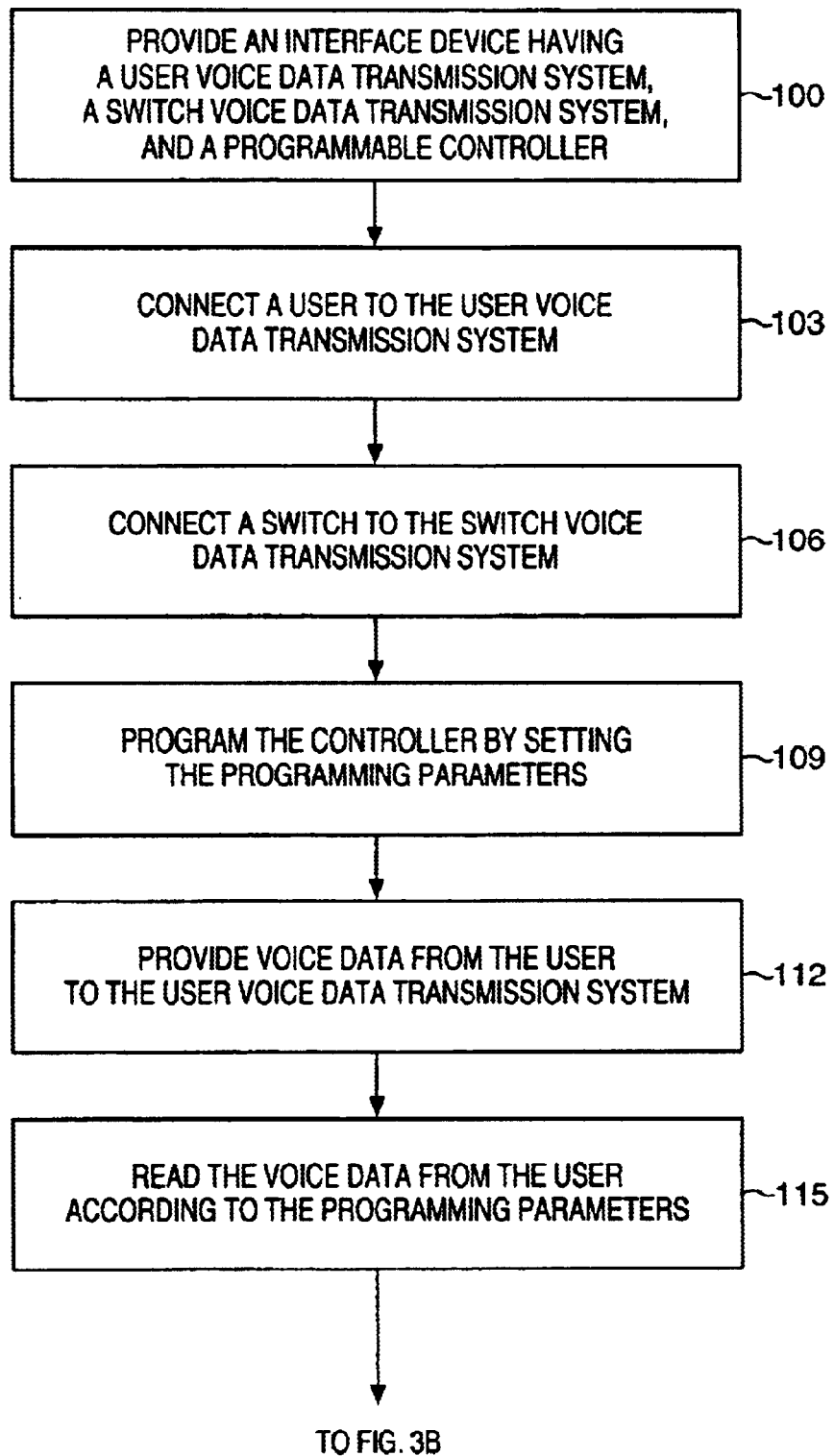

FIGS. 3A and 3B illustrate a method of interfacing according to the invention. The method may include providing an interface device 100 having a user voice data transmission system, a switch voice data transmission system and a programmable controller in communication with the transmission systems. Those are the components designated 13, 16 and 64 in FIGS. 1 and 2. A user may be connected 103 to the user voice data transmission system, and a switch may be connected 106 to the switch voice data transmission system. The controller may be programmed 109 by setting programming parameters specified by the user. The programming parameters may include a polarity of a frame synchronization signal, a clock signal rate, a frame synchronization signal location, a polarity of a clock signal, a source of a clock signal, a source of a frame synchronization signal, and time slots within the frame that may contain voice data. The number of time slots per frame may be thought of as a programming parameter, however, in existing systems the number of time slots per frame is dictated by the clock rate.

Voice data from the user may be provided 112 to the user voice data transmission system, and read 115 according to the programming parameters. The read voice data may be stored 118 in the user voice data transmission system. Then the stored voice data may be provided 121 to the switch.

The method may include synchronization of a frame synchronization signal to a network common frame synchronization signal. For example, the programming parameter corresponding to the source of a frame synchronization signal may be set as the interface device. The frame synchronization signal may be provided, and synchronized to the network common frame synchronization signal, for example, by the controller.

The method may also include providing 124 voice data from the switch to the switch voice data transmission system, reading 127 the voice data from the switch and storing 130 the voice data from the switch in the switch voice data transmission system. Then stored voice data from the switch is provided 133 to the user according to the programming parameters.

It may be appreciated that the invention provides a programmable device for and method of interfacing between a user, such as a TDM interface of a computer system, and a switch, such as a PBX. For example, an interface device according to the invention may be programmed to accommodate a first user operating on one protocol, and if the first user is replaced with a second user operating on another protocol, then the interface device need not be replaced: The interface device only needs to be reprogrammed.

Although the invention has been described with respect to one or more particular embodiments, it will be understood that other embodiments of the invention may be made without departing from the spirit and scope of the invention.

What is claimed is:

1. An interface device, comprising:
   a user voice data transmission system having a user data storage device;
   a switch voice data transmission system having a switch data storage device; and
   a programmable controller in communication with the user voice data transmission system, and in communication with the switch voice data transmission system, the controller being programmable according to programming parameters to enable receipt of voice data via the user voice data transmission system and to enable sending of voice data via the switch voice data transmission system, wherein the programming parameters include a polarity of a frame synchronization signal.

2. The interface device of claim 1, wherein the user data storage device includes a receiving storage device and a sending storage device.

3. The interface device of claim 1, wherein the switch data storage device includes a receiving storage device and a sending storage device.

4. The interface device of claim 1, wherein the programming parameters include a clock signal rate.

5. The interface device of claim 1, wherein the programming parameters include a frame synchronization signal location.

6. The interface device of claim 1, wherein the programming parameters include a polarity of a clock signal corresponding to the clock signal rate.

7. The interface device of claim 1, wherein the programming parameters include a number of time slots per frame.

8. The interface device of claim 1, wherein the programming parameters include time slots within a frame that may contain voice data.

9. A method of interfacing, comprising:
   providing a user voice data transmission system for connection to a user;
   providing a switch voice data transmission system for connection to a switch;
   providing a programmable controller in communication with the user voice data transmission system and in communication with the switch data transmission system; and
   programming the controller according to programming parameters to enable receipt of voice data via the user voice data transmission system and to enable sending of voice data via the switch voice data transmission system, wherein the programming parameters include a polarity of a frame synchronization signal.

10. The method of claim 9, wherein the programming parameters include a clock signal rate.

11. The method of claim 10, wherein the clock signal rate may be selected from a group of known user clock signal rates.

12. The method of claim 9, wherein the programming parameters include a frame synchronization signal location.

13. The method of claim 12, wherein the frame synchronization signal location may be programmed as straddling a frame boundary.

14. The method of claim 12, wherein the frame synchronization signal location may be programmed as occurring during a last bit time of previous frame.

15. The method of claim 12, wherein the frame synchronization signal location may be programmed as occurring during a first bit time of a frame.

16. The method of claim 12, wherein the frame synchronization signal location may be programmed as enveloping a voice data slot.

17. The method of claim 9, wherein the programming parameters include a polarity of a clock signal.

18. The method of claim 17, wherein setting the polarity of the clock signal causes the controller to instruct the user voice data transmission system to shift data into the user voice data transmission system on a rising edge of the clock signal.

19. The method of claim 17, wherein setting the polarity of the clock signal causes the controller to instruct the switch voice data transmission system to shift data out of the switch voice data transmission system on a falling edge of the clock signal.

20. The method of claim 17, wherein setting the polarity of the clock signal causes the controller to instruct the user voice data transmission system to shift data into the user voice data transmission system on a falling edge of the clock signal.

21. The method of claim 17, wherein setting the polarity of the clock signal causes the controller to instruct the switch voice data transmission system to shift data out of the switch voice data transmission system on a rising edge of the clock signal.

22. The method of claim 9, wherein the programming parameters include a source of a clock signal.

23. The method of claim 9, wherein the programming parameters include a source of a frame synchronization signal.

24. The method of claim 23, further comprising:
setting the programming parameter corresponding to the source of a frame synchronization signal as the interface device;
providing a frame synchronization signal; and
synchronizing the frame synchronization signal to a network common frame synchronization signal.

25. The method of claim 9, wherein the programming parameters include a number of time slots per frame.

26. The method of claim 25, wherein the programming parameters include time slots within the frame that may contain voice data.

27. The method of claim 9, further comprising:
connecting a user to the user voice data transmission system;
connecting a switch to the switch voice data transmission system;
providing voice data from the user to the user voice data transmission system;
reading the voice data from the user according to the programming parameters;
storing the voice data from the user in the user voice data transmission system;
providing the stored voice data from the user to the switch;
providing voice data from the switch to the switch voice data transmission system;
reading the voice data from the switch;
storing the voice data from the switch in the switch voice data transmission system; and
providing the stored voice data from the switch to the user according to the programming parameters.

28. An interface device, comprising:
a user voice data transmission system having a user data storage device capable of reading and storing user voice data provided by a user, and capable of providing the user voice data to a switch;
a switch voice data transmission system having a switch data storage device capable of reading and storing switch voice data provided by the switch, capable of providing the switch voice data to the user; and
a programmable controller in communication with the user voice data transmission system, and in communication with the switch voice data transmission system, the controller being programmable according to programming parameters that include a polarity of a frame synchronization signal, a clock signal rate, and a frame synchronization signal location, and once programmed with the programming parameters, the controller is capable of (a) instructing the user voice data transmission system to read the user voice data according to the programming parameters, (b) instructing the user data storage device to store the user voice data, and (c) instructing the user data storage device to provide the stored user voice data to the switch, and (d) reading the switch voice data, (e) instructing the switch data storage device to store the switch voice data, and (f) instructing the switch data storage device to provide the stored switch voice data to the user in a format according to the programming parameters.

29. The interface device of claim 28, wherein the user data storage device includes a receiving storage device and a sending storage device, the receiving storage device is capable of storing the user voice data until the sending storage device is ready to accept the user voice data stored in the receiving storage device.

30. The interface device of claim 29, wherein the receiving storage device includes a serial-parallel register.

31. The interface device of claim 30, wherein the serial-parallel register is in communication with the user.

32. The interface device of claim 30, wherein the receiving storage device further includes an intermediate register having a receiving port in communication with the serial-parallel register and a sending port in communication with the sending storage device.

33. The interface device of claim 28, wherein the switch data storage device includes a receiving storage device and a sending storage device, the receiving storage device is capable of storing the switch voice data until the sending storage device is ready to accept switch voice data stored in the receiving storage device.

34. The interface device of claim 33, wherein the sending storage device includes a parallel-serial register.

35. The interface device of claim 33, wherein the receiving storage device includes an intake register and an intermediate register, the intermediate register having a receiving port in communication with the intake register and having a sending port in communication with the sending storage device.

36. The interface device of claim 28, wherein the programming parameters further include a polarity of a clock signal corresponding to the clock signal rate.

37. The interface device of claim 28, wherein the clock signal rate may be programmed by selecting from a group of known user clock signal rates.

38. The interface device of claim 28, wherein the frame synchronization signal location may be programmed as straddling a frame boundary.

39. The interface device of claim 28, wherein the frame synchronization signal location may be programmed as occurring during a last bit time of a previous frame.

40. The interface device of claim 28, wherein the frame synchronization signal location may be programmed as occurring during a first bit time of a frame.

41. The interface device of claim 28, wherein the frame synchronization signal location may be programmed as enveloping a voice data slot.

42. The interface device of claim 28, further comprising a bit clock capable of providing a clock signal to the user.

43. The interface device of claim 42, wherein the controller uses the clock signal to control the user data storage device and the switch data storage device.

44. The interface device of claim 28, further comprising a frame synchronization signal generator capable of providing a frame synchronization signal to the user.

45. The interface device of claim 44, wherein the controller uses the frame synchronization signal to control the user data storage device and the switch data storage device according to the programming parameters.

46. The interface device of claim 28, further comprising a network common frames synchronization signal generator and a frame reference signal port, wherein the network common frame synchronization signal generator is capable of providing a network common frame synchronization signal to the user that is oscillating at a rate substantially equal to an oscillation rate of a frame reference signal provided at the frame reference signal port.

47. The interface device of claim 28, further including a network common frame synchronization signal generator, a frame reference signal port and an internal clock, the network common frame synchronization signal generator being capable of oscillating at (a) an oscillation rate that is substantially equal to an oscillation rate of a frame reference signal port, and (b) an oscillation rate substantially equal to an oscillation rate of the internal clock if no frame reference signal is provided at the frame reference signal port.

48. The interface device of claim 28, wherein the controller includes a frame synchronization signal port for receiving a frame synchronization signal from the user, and the controller is capable of using the frame synchronization signal to control the user data storage device and the switch data storage device according to the programming parameters.

49. The interface device of claim 28, wherein the controller includes a clock signal port for receiving a clock signal from the user, and the controller is capable of using the clock signal to control the user data storage device and the switch data storage device according to the programming parameters.

50. The interface device of claims 28, wherein the controller is capable of instructing the user voice data transmission system to shift data into the user data storage device on a rising edge of a clock signal provided to the controller and the user.

51. The interface device of claim 50, wherein the controller is capable of instructing the switch voice data transmission system to shift data out of the switch data storage device on a falling edge of a clock signal provided to the controller and the user.

52. The interface device of claim 28, wherein the controller is capable of instructing the user voice data transmission system to shift data into the user data storage device on a falling edge of a clock signal provided to the controller and the user.

53. The interface device of claim 52, wherein the controller is capable of instructing the switch voice data transmission system to shift data out of the switch data storage device on a rising edge of a clock signal provided to the controller and the user.

54. The interface device of claim 28, wherein the programming parameters further include a clock polarity for instructing the controller whether to shift data into the user data storage device on a rising edge or a falling edge of a clock signal provided to the controller.

55. The interface device of claim 28, wherein the programming parameters further include a clock polarity for instructing the controller whether to shift data out of the switch data storage device on a rising edge or a falling edge of a clock signal provided to the controller.

56. The interface device of claim 28, wherein the programming parameters further include a number of time slots per frame.

57. The interface device of claim 28, wherein the programming parameters further include time slots within a frame that may contain voice data.

58. The interface device of claim 28, wherein the programming parameters further include a source of a clock signal corresponding to the clock signal rate.

59. The interface device of claim 28, wherein the programming parameters further include a source of the frame synchronization signal.

* * * * *